Nov. 24, 1953 T. A. WOOLSEY 2,659,953
COUPLING CLAMP WITH CONSTANT SPRING LOADING
Filed Oct. 12, 1951
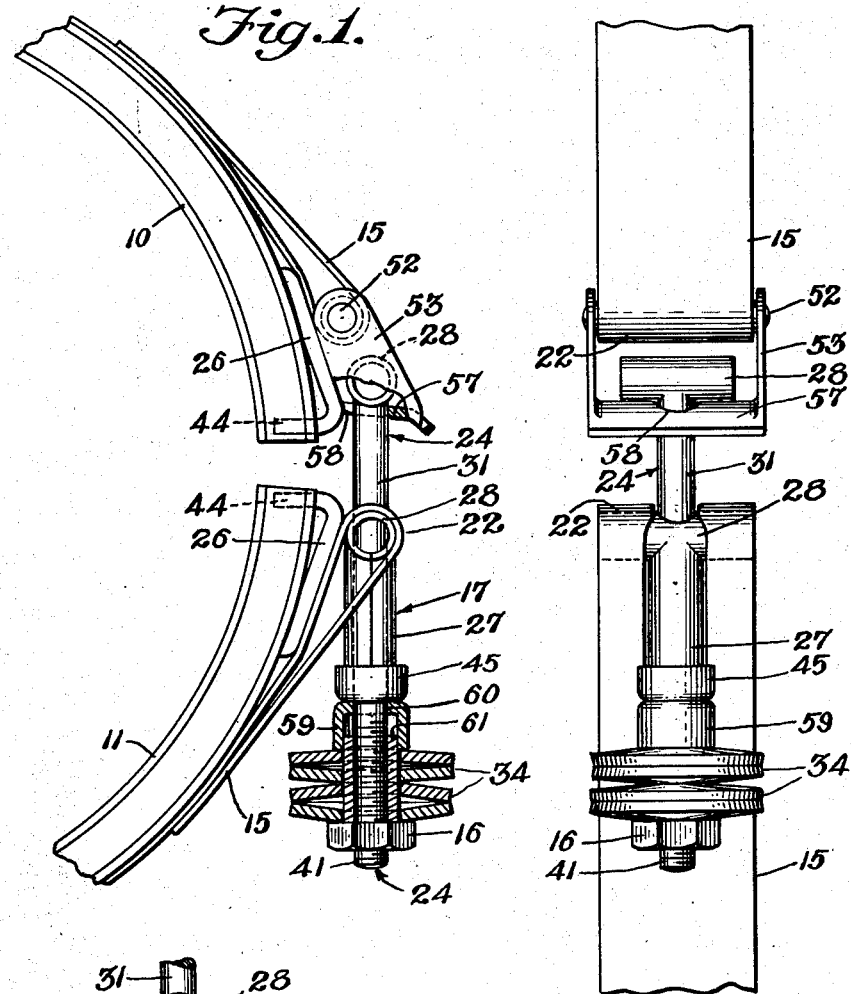
INVENTOR.
THEODORE A. WOOLSEY
BY
ATTORNEY.

Patented Nov. 24, 1953

2,659,953

UNITED STATES PATENT OFFICE 2,659,953

COUPLING CLAMP WITH CONSTANT SPRING LOADING

Theodore A. Woolsey, Inglewood, Calif.

Application October 12, 1951, Serial No. 251,080

6 Claims. (Cl. 24—279)

This invention relates to band couplings or clamps and has as its general object to provide an improved connector for the circumferentially opposed ends of a split clamping or coupling band, with a zero rate spring loading means incorporated therein, for maintaining a constant tension load in the band while yieldingly accommodating circumferential extensions thereof.

The invention relates particularly to the type of spring loaded connector means disclosed in my co-pending application Serial No. 251,473, filed concurrently herewith, said co-pending application being a continuation in part of my earlier application Serial No. 95,765, filed May 27, 1949 (now abandoned), and the present application constituting in part a continuation of said concurrently filed co-pending application.

In the aforesaid co-pending application I have disclosed three different forms of my invention for a spring loaded coupling utilizing relatively small diameter Belleville spring washers stacked upon a take-up bolt forming a portion of means for connecting in tension the opposed ends of a clamping or coupling band. In one of those forms, the bolt has a threaded end which is threaded into a T-trunnion attached to one end of the band; in another form, the take-up bolt has a shank portion extending loosely through the tubular stem of a T-trunnion and has a threaded end portion onto which a nut is threaded into engagement with said tubular stem; and in a third form, the take-up bolt constitutes a portion of a toggle linkage including toggle arms pivoted to each other at their one ends and at their opposite ends attached to the respective opposed band end portions, the bolt cooperating with a nut to adjust the connection between the toggle arms and the band end portions.

The improvement of the present invention may be incorporated in any one of the three forms of my initial invention, referred to above, but is herein shown, by way of exemplification, in connection with only one of those forms. Such showing herein is sufficient to indicate how the arrangement of any one of the three basic forms of the invention may be modified so as to incorporate the present improvements therein. For more specific disclosure of the details of the above referred to three basic forms of the general invention, reference is made to the above identified concurrently filed continuation application.

The present invention deals particularly with the problem of avoiding contact between the threads of the take-up bolt and the inner edges of the Belleville spring washers. If the inner edges of the washers were allowed to bear against the bolt threads, they would tend to catch on the threads and this would interfere with operation of the washers in maintaining uniform load transmission through the connector assembly. Also, it would tend to abrade the inner edges of the washers and also the bolt threads in a damaging manner which would ultimately seriously impair the operating efficiency of the assembly.

With the foregoing in view, the primary object of the present invention is to provide an improved band connector assembly embodying Belleville washers and having improved means for preventing contact of the washers with bolt threads.

Other objects will become apparent in the ensuing specifications and appended drawings in which:

Fig. 1 is a side view of a portion of a band coupling embodying my invention, parts being shown in sections;

Fig. 2 is a view showing the same as viewed in a radial direction; and

Fig. 3 is a fragmentary sectional view of a connector embodying a modified form of the invention.

As an example of one form of coupling in which my invention may be embodied, I have shown, in Figs. 1 and 2, a portion of a V-band type tube coupling comprising a generally annular band having circumferentially separated end portions each provided with a bearing saddle 15. Each saddle 15 is formed from a length of strap metal bent back upon itself to define a trunnion receiving loop portion 22 and leg portions of unequal length, securely joined as by spot welding, to respective band end portions 10, 11. Each saddle has a bracket 26 secured thereto as by welding and having a bifurcated arm 44 embracing the respective band end portion 10 or 11 for reinforcing the same against spreading. Reference is made to the above identified concurrently filed application for a more detailed disclosure of the features above described.

In the bearing loop 22 of one of the saddles 15 is journalled the cross pin 52 of a pivoted latch receptacle 53 which is of U-shape, having a web portion 57 that is provided with a slot 58 to receive the shank of a T-trunnion bolt 24. Bolt 24 has a T head 28 which is receivable in latch receptacle 53 to connect the bolt to the receptacle.

Journalled in the bifurcated loop portion 22 of the other saddle 15 is the T head 28 of a T-trunnion 17. Trunnion 17 has a tubular stem 27 through which a smooth shank portion 31 of bolt 24 extends. In the particular form shown, T-trunnion 17 is of stamped sheet metal construction, the stem 27 being defined between opposed semi-cylindrical sections the ends of which are bound together by a cap 45 in which said ends are received.

Shank 31 has a threaded end portion 41, which may extend throughout any desired portion of the length of shank 31, thus to provide, within the limits determined by the excess in the length of bolt 24 over that of stem 27, any desired amount of adjustment of the circumferential dimension of the coupling band.

Encircling threaded end portion 41 are a plurality of Belleville spring washers 34 arranged in pairs with paired washers facing each other and having their peripheries in abutting engagement. The inner extremities of remote washers are engaged under compression between a nut 16 threaded onto threaded portion 41 of bolt 24 and a bearing cap 59 having an apertured head portion 60 bearing against cap 45 and having the edge of its lateral wall portion bearing against the adjacent washer 34.

Washers 34 have a load deflection curve such that the useful portion thereof has a substantially zero rate (constant loading).

Spring washers 34 have central openings of larger diameter than bolt 24, so as to receive a bearing sleeve 61 which is interposed between the washers 34 and the threaded portion 41 of the bolt. Threaded portion 41 extends through the opening in head 60 of bearing cup 59, and through the sleeve 61. Sleeve 61 telescopes into cap 59, with end clearance in the initial stages of deflection of washers 34, sufficient to allow the full range of deflection of washers 34 without having sleeve 61 bottom in cap 59.

In order to provide against sleeve 61 becoming displaced with reference to the washer assembly, its end remote from cap 59 is press-fitted into the outer washer 34 immediately adjoining nut 16. Thus the sleeve is constantly positioned with reference to said outer washer and the adjoining nut.

In the operation of this form of the invention, as nut 16 is advanced on the threaded shank of bolt 24, compressing washers 34, the opposite end of sleeve 61 will advance into cap 59 to accommodate the decreasing distance between nut 16 and cap 59. The compressive forces of washers 34 are transmitted by cap 59 to bearing cap 45.

In the form of the invention shown in Fig. 3, the arrangement is the same as that described above with the exception that a nut 16' has an integral reduced sleeve portion 61' to take the place of sleeve 61 of Fig. 1. Sleeve portion 61' extends through washers 34 and is telescoped into cap 59 with end clearance such as to allow the desired amount of deflection of washers 34. Washers 34 are engaged under compression between cap 59 and a shoulder 62 in nut 16', said shoulder 62 being defined at the base of sleeve portion 61' in the form of an offset between the two diameters of the nut.

Nut 16' is elongated axially to project beyond the threaded end portion 41 of bolt 24 and is provided, in its projecting end portion, with a handle bar 63 which extends through an opening therein. Handle bar 63 is of such dimensions as to provide for rotating nut 16' by direct engagement in the hand of the operator, eliminating the necessity for using a wrench.

I claim:

1. In a band coupling, a coupling band having at least two circumferentially spaced and opposed end portions; a take-up bolt; quickly releasable coupler means for attaching one end of said bolt to one of said end portions; an abutment element having a pivotal connection with the other band end portion and having an abutment portion provided with an opening; said bolt extending through said opening and having a threaded end portion projecting therefrom; a pair of telescoped tubular elements through which said threaded portion extends, one of said tubular elements being in abutting engagement with said abutment element; a stack of Belleville washer springs encircling the other of said tubular elements, said springs having a load deflection curve providing substantially constant loading in the useful portion thereof; and a nut threaded on said threaded bolt portion; said springs being confined under compression between said one tubular element and said nut.

2. A coupling as defined in claim 1, wherein said other tubular element is in the form of a spacer sleeve separate from said nut, and wherein said one tubular element is in the form of a cap having a rim bearing against the adjacent washer and receiving the adjacent end portion of said sleeve, and having a head provided with an opening through which said bolt extends, said head bearing against said abutment portion of the abutment element.

3. A coupling as defined in claim 1, wherein said other tubular element is in the form of a sleeve integral with and projecting axially from said nut, said nut, where it adjoins said sleeve, having an end portion projecting radially outwardly from said sleeve to define a shoulder which engages one end of said washer stack.

4. In a coupling, a band having at least two circumferentially separated end portions provided with bearing loops; a latch element pivoted in one of said bearing loops; a take-up bolt having at one end a head inter-engageable with said latch element and having at its other end a threaded portion; a T-trunnion having a head pivoted in the other of said bearing loops and having a tubular stem through which said bolt extends with said threaded portion projecting beyond the end thereof; a pair of telescoped tubular members encircling said threaded portion, one of said tubular members being in the form of a cap having a head provided with an opening through which said bolt extends, said head being in abutting engagement with the end of said stem, the other end of said cap being open, the other tubular member being a sleeve having an end portion received in said open end of the cap and spaced from said head; a stack of Belleville spring washers encircling said sleeve with one end of said stack abutting said open end of the cap; and a nut threaded on said threaded portion and abutting the other end of said washer stack; said washers having a load deflection curve providing substantially constant loading in the useful portion thereof.

5. In a coupling, a band having at least two circumferentially separated end portions provided with bearing loops; a take-up bolt, means providing a pivotal connection between one end of said bolt and one of said bearing loops, said bolt having at its other end a threaded portion; a T-trunnion having a head pivoted in the other of said bearing loops and having a tubular stem through which said bolt extends with said threaded portion projecting beyond the end thereof; a pair of telescoped tubular members encircling said threaded portion with the tubular member of larger diameter in abutting engagement with the end of said stem; a stack of Belleville spring washers encircling the smaller of said tubular members with one end of said stack abutting said larger tubular members; and a nut threaded on said threaded portion and abutting the other end of said washer stack.

6. In a coupling, a band having at least two circumferentially separated end portions provided with bearing loops; a take-up bolt, means providing a pivotal connection between one end of said bolt and one of said bearing loops, said bolt having at its other end a threaded portion; a T-trunnion having a head pivoted in the other of said bearing loops and having a tubular stem through which said bolt extends with said threaded portion projecting beyond the end thereof; an abutment cap having an apertured head abutting the end of said stem; a spacer sleeve having one end telescoped into said cap; a stack of Belleville spring washers encircling said sleeve with one end of said stack abutting the open end of said cap; and a nut threaded onto said threaded portion and abutting the other end of said washer stack, said bolt projecting through the aperture of said cap head and said threaded portion projecting through said sleeve; said washers having a load deflection curve providing substantially constant loading in the useful portion thereof.

THEODORE A. WOOLSEY.

References Cited in the file of this patent

UNITED STATES PATENTS

| Number | Name | Date |
| --- | --- | --- |
| 1,487,903 | Vitek | Mar. 25, 1924 |
| 1,826,597 | Brecht | Oct. 6, 1931 |
| 2,325,193 | Nutt et al. | July 27, 1943 |
| 2,395,745 | King | Feb. 26, 1946 |
| 2,522,494 | Baldo | Sept. 19, 1950 |

FOREIGN PATENTS

| Number | Country | Date |
| --- | --- | --- |
| 370,408 | France | Dec. 19, 1906 |